Jan. 7, 1969  YOSHIO FUKUSHIMA  3,420,153
SHUTTER FOR PHOTOGRAPHIC CAMERAS
Original Filed Sept. 16, 1966
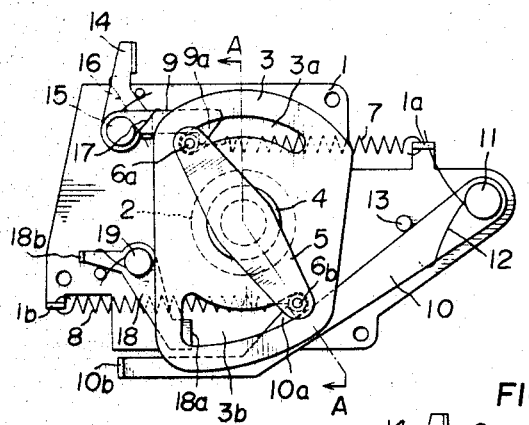
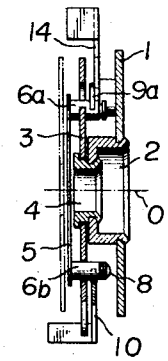
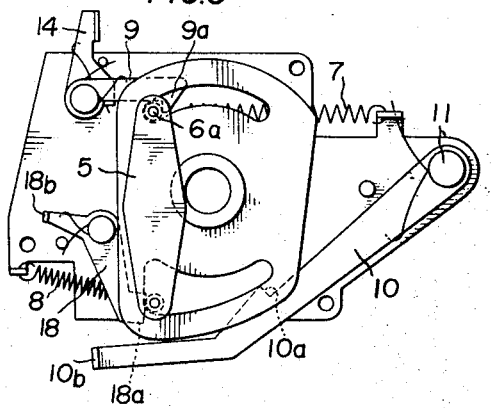
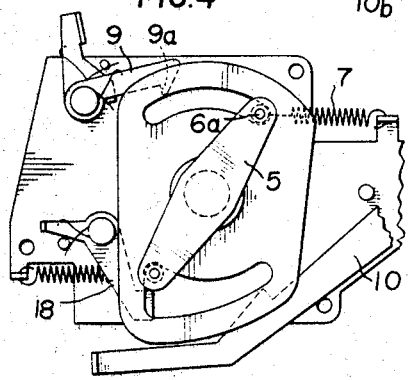
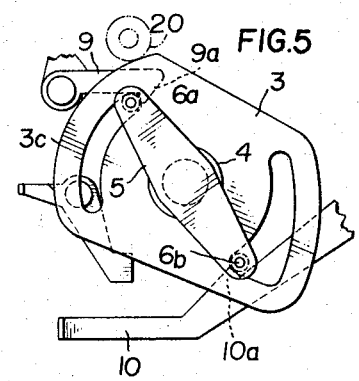
INVENTOR.
YOSHIO FUKUSHIMA
BY
Burgess, Ryan & Hicks
ATTORNEYS

3,420,153
SHUTTER FOR PHOTOGRAPHIC CAMERAS
Yoshio Fukushima, Tokyo, Japan, assignor to Kabushiki Kaisha Ricoh, Tokyo, Japan, a corporation of Japan
Continuation of application Ser. No. 580,066, Sept. 16, 1966. This application Nov. 2, 1966, Ser. No. 604,091
Claims priority, application Japan, Sept. 16, 1965, 40/56,356

U.S. Cl. 95—59    8 Claims
Int. Cl. G03b 9/10

This application is a continuation of application Ser. No. 580,066, filed Sept. 16, 1966.

This invention relates to a lens shutter for photographic cameras. More particularly, it relates to such a shutter in which a single spring actuated blade effects an exposure by moving sideways out of and then back into a blocking position in which it intercepts light rays directed through the shutter mechanism.

An object of the present invention is to provide a lens shutter of a new and novel type wherein a shutter blade effects a movement completely different from that known with the conventional lens shutters.

A further object of the invention is to provide an inexpensive shutter mechanism which is uncomplicated and durable.

A still further object of the invention is to provide a single blade shutter in which the blade is not supported for rotation about a fixed axis, in order to avoid binding or sticking which may occur with such support, to the end that high shutter speed may be obtained.

Further objects of the invention will be apparent from the following description, taken in connection with the accompanying drawings, wherein:

FIG. 1 represents a front view of a shutter embodying the invention in a cocked position;

FIG. 2 is a cross sectional view of the embodiment of FIG. 1, taken on cutting plane A—A of FIG. 1; and FIGS. 3 through 5 are front views of the embodiment of FIG. 1, showing parts thereof during various operations; viz., FIG. 3 showing the shutter in an opened position, FIG. 4 indicating the same in a closed position, and FIG. 5 representing the same in a charged position.

In the embodiment shown, a base plate 1 of the shutter mechanism bears a lens supporting barrel 2. A shutter cocking member 3 is mounted rotatably around the optical axis O of the lens on a flanged sleeve 4 provided on said lens supporting barrel 2. The shutter cocking member 3 is provided with a first arcuate slot 3a which is centered upon said optical axis of the lens. A first pin 6a, affixed to one end of a shutter blade 5, is loosely fitted in slot 3a. Shutter cocking member 3 is further provided with a second arcuate slot 3b of elongated triangle shape which is in a position diametrically opposed to arcuate slot 3a. A second pin 6b, affixed to the opposite end of said shutter blade 5 from pin 6a, is loosely fitted in second arcuate slot 3b. Second arcuate slot 3b is bounded by a curved wall (uppermost in the drawings) centered on optical axis O and a curved lower wall (lowermost in the drawings) centered on one end (to the left in the drawings) of the first arcuate slot 3a.

A first tension spring 7 is secured, at one extremity thereof, to an abutment 1a of the base plate 1, and at the other extremity to first pin 6a, on which it exerts a force to the right in the drawings. A second tension spring 8 is affixed, at one extremity thereof, to an abutment 1b of said base plate 1. The other extremity of tension spring 8 is attached to second pin 6b and exerts a force thereon to the left as shown in the drawings.

FIG. 1 shows the shutter in a cocked position achieved by an operation hereinafter described. In the cocked position the aforesaid first pin 6a and second pin 6b are respectively engaged, against the force of springs 7 and 8, with a first hook 9a of a first latch member 9 and a second hook 10a of a second latch member 10. The second latch member 10 is pivotally mounted on the base plate 1 by a stud 11 and is urged in a clockwise direction by the force of a spring 12. Clockwise rotation of second latch member 10 is limited by a stop 13. The first latch member 9 is pivotally mounted, coaxially with a shutter closure lever 14, on the base plate 1 by means of stud 15. Shutter closure lever 14 is urged to rotate in a clockwise direction by a spring 16, while the first latch member 9 is similarly urged, by a spring 17, to rotate in a clockwise direction relative to said shutter closure lever 14. A governor release lever 18, which is pivotally mounted on the base plate 1 by a stud 19, has an extremity 18a which overlaps the second arcuate slot 3b. A second extremity 18b on governor release lever 18 is connected to a governor or timer (not shown) and is adapted to initiate a timing cycle in the governor when the governor release lever rotates clockwise. The governor is also connected to shutter closure lever 14 and is adapted to rotate said shutter closure lever in a counterclockwise direction at the end of a timing cycle. The governor may be of any well known mechanical or electromechanical construction, and will usually have arrangements for varying the length of the timing cycle.

Depression of a shutter button (not shown in the drawings), causes it to contact extremity 10b of the second latch member 10 and to revolve said member around the stud 11 from the position of FIG. 1 to that illustrated in FIG. 3, causing the second pin 6b to disengage from the second hook 10a of second latch member 10. Said disengagement allows the shutter blade 5 to revolve around first pin 6a in a clockwise direction under the influence of spring 8 and thus opens the shutter aperture.

Concurrent with the opening of the shutter aperture, the second pin 6b strikes against the extremity 18a of the governor release lever 18, causing said lever to rotate and thereby actuate the shutter governor mechanism. After the lapse of a predetermined time interval, the shutter governor acts on the shutter closure lever 14 which is thereby rotated in a counterclockwise direction, causing the first pin 6a to disengage from the first hook 9a of the first latch member 9 and to be drawn to the right as shown in the drawing, whereupon shutter blade 5 moves to the position shown in FIG. 4, closing the shutter aperture.

In order to cock the shutter, it suffices to oscillate the shutter cocking member 3 on the supporting sleeve 4, first in a counterclockwise direction to the position shown in FIG. 5 and then back to that of FIG. 1. Such rotation reengages first pin 6a with first latch member 9 and second pin 6b with second latch member 10.

The reciprocating movement of the shutter cocking member 3 can be easily effected by coupling said member with a film winding operation. FIG. 5 shows an embodiment wherein a gear 20 rotatable in an oscillating motion by means of film winding operation is engaged in meshing relation with a gear (not shown in the drawing) formed on a partial periphery 3c of the shutter cocking member 3, whereby the shutter cocking member is caused to make an oscillatory movement.

The shutter blade of this invention is extremely simple compared with the blades of conventional lens shutters. Particularly, in contrast to the conventional shutter blades which make reciprocating motion around a fixed axis, the two extremities of the shutter blade incorporating this invention are so disposed as to make alternate oscillating movements, which requires no fixed revolving axis, thereby ensuring ease of motion and hence, an extremely high velocity of the shutter operation. Furthermore, the fact that a shutter constructed according to this invention requires only one shutter blade ensures simplicity and durability of the shutter structure as well as ease and economy of manufacture. Since the single blade is loosely mounted in a space between flanged sleeve 4 and an apertured plate (shown in dashed lines in FIG. 2) it cannot bind, as is sometimes the case where a multiplicity of blades overlap and move relative to each other.

The following is claimed:

1. A shutter comprising
   (a) a surface defining a light-admitting aperture;
   (b) a shutter blade having first and second extremities;
   (c) first guide means for guiding the first extremity from a latched position to an unlatched position while the second extremtiy is in an unlatched position;
   (d) second guide means for guiding the second extremity from a latched to an unlatched position while the first extremity is in its latched position, motion of the second extremity while guided being in a direction opposite to motion of the first extremity when the latter is moving from its latched to its unlatched position;
   (e) a central portion of the shutter blade occluding the light-admitting aperture when both the first and second extremities are in their latched positions or in their unlatched positions, said central portion lying to one side of the light-admitting aperture when the first extremity is in the latched position and the second extremity is in the unlatched position;
   (f) first holding means for releasably holding the first extremity in the latched position;
   (g) second holding means for releasably holding the second extremity in the latched position;
   (h) means for exerting a resilient force on the first extremity sufficient to move the first extremity from the latched to the unlatched position thereof upon release of the first holding means; and
   (i) means for exerting a resilient force on the second extremity sufficient to move the second extremity from the latched to the unlatched position thereof upon release of the second holding means.

2. The shutter of claim 1 comprising cocking means for returning both the first and second extremities to their respective latched positions from their respective unlatched positions while maintaining the light-admitting aperture in an occluded condition.

3. The shutter of claim 2 wherein
   (a) the cocking means comprises a plate;
   (b) the first guide means comprises surfaces on the plate defining a first slot therein, said first slot extending in a non-radial direction with respect to the center of the light-admitting aperture, and a follower member carried by the first extremity and extending into the first slot;
   (c) the second guide means comprises surfaces on the plate defining a second slot therein, said second slot extending in a non-radial direction with respect to the center of the light-admitting aperture, and a follower member carried by the second extremity and extending into the second slot;
   (d) the plate is mounted for rotation during a shutter cocking operation about an axis lying between the first and second slots; and
   (e) the cocking means further comprises surfaces on the plate adapted to engage the first and second guide means upon rotation of the plate during a shutter cocking operation and move said first and second guide means, respectively, into held engagement with the first and second holding means.

4. A shutter for use in a camera having an optical axis, said shutter comprising,
   (a) surfaces defining a light-admitting aperture adapted to be centered on the optical axis;
   (b) a shutter cocking member of plate form extending on opposite sides of the light-admitting aperture and movable from a rest position to a shutter cocking position;
   (c) an elongated shutter blade having first and second extremities;
   (d) surfaces defining a first slot in the shutter cocking member, said first slot being in the form of an arc centered on the light-admitting aperture and said first slot having a latch end and a released end;
   (e) surfaces defining a second slot in the shutter cocking member, said second slot lying on the opposite side of the light-admitting aperture from the first slot and approximately the same distance from the light-admitting aperture as the first slot, and said second slot having an inner surface in the form of an arc centered on the light-admitting aperture and an outer surface in the form of an arc centered on the latch end of the first slot, and said second slot having a latch end and a released end, the latch end of the second slot being located in diametrical opposition to the latch end of the first slot, referred to the light-admitting aperture as center, and the released end of the second slot being located in diametrical opposition to the released end of the first slot, also referred to the light-admitting aperture as center;
   (f) a first pin extending from the first extremity of the shutter blade into the first slot;
   (g) a second pin extending from the second extremity of the shutter blade into the second slot;
   (h) a central portion of the shutter blade between the first and second pins, said central portion occluding the light-admitting aperture when the first and second pins are diametrically opposed with respect to said light-admitting aperture;
   (i) first latch means for releasably holding the first pin in a position coincident with the latch end of the first slot when the shutter cocking member is in the rest position;
   (j) second latch means for releasably holding the second pin in a position coincident with the latch end of the second slot when the shutter cocking member is in the rest position;
   (k) means for supporting the shutter cocking member for rotation of said member about the light-admitting aperture from the rest position to the shutter cocking position, said rotation extending through a sufficient angle to move the first pin into latched engagement with the first latch means when said first pin is in the released end of the first slot and to move the second pin into latched engagement with the second latch when said second pin is in the released end of the second slot;
   (l) a first spring exerting resilient force on the first pin sufficient to move said first pin to the released end of the first slot upon release of said first pin by the first latch means; and
   (m) a second spring exerting a resilient force on the second pin sufficient to move said second pin to the released end of the second slot upon release of said second pin by the second latch means.

5. The shutter of claim 4 comprising a release lever having an extremity located to be contacted and moved by the second pin when said second pin moves to the released end of the second slot while the shutter cocking member is in the rest position.

6. The shutter of claim 4 comprising means for detecting the arrival of the first pin at the released end of the second slot while the shutter release member is in rest position and for thereupon activating a timing mechanism.

7. A shutter for photographic cameras comprising a shutter blade having two extremities which are urged, by the resilient force of springs, for movement in opposite directions to each other, said shutter blade having no fixed revolving axis, a cocking member which rotates said extremities against the force of the springs, members to hold said extremities of the shutter blade respectively at their rotated positions such that one such extremity is disengageable from said members when the shutter is to be opened whilst the other is disengageable from said members when the shutter is to be closed.

8. A shutter comprising,
    (a) surfaces defining a light-admitting aperture;
    (b) a shutter blade having first and second extremities and a central portion located between said extremities;
    (c) means for supporting the shutter blade in a cocked position with the central portion occluding the light-admiting aperture;
    (d) means for moving the second extremity in a first rotary motion about the first extremity of sufficient distance to uncover the light-admitting aperture;
    (e) means for moving the first extremity in a second rotary motion about the second extremity a sufficient distance to occlude the light admitting aperture with the central portion, said second rotary motion being in the same rotary direction as the first rotary motion; and
    (f) means for restoring the shutter blade to the cocked position by rotating said shutter blade in a third rotary motion opposite in rotary direction to the first rotary motion while simultaneously maintaining the central portion in occluding relation to the light-admitting aperture.

References Cited

UNITED STATES PATENTS

| | | | |
|---|---|---|---|
| 1,033,524 | 7/1912 | Bornmann | 95—59 |
| 2,446,265 | 8/1948 | Crumrine | 95—59 |
| 2,571,756 | 10/1951 | Pribus | 95—59 |
| 2,857,829 | 10/1958 | Rentschler | 95—59 |

NORTON ANSHER, *Primary Examiner.*

L. H. McCORMICK, JR., *Assistant Examiner.*